Sept. 10, 1929.　　　F. O. VAUGHN　　　1,727,950
HEAT REGULATOR
Filed June 30, 1928　　　2 Sheets-Sheet 1
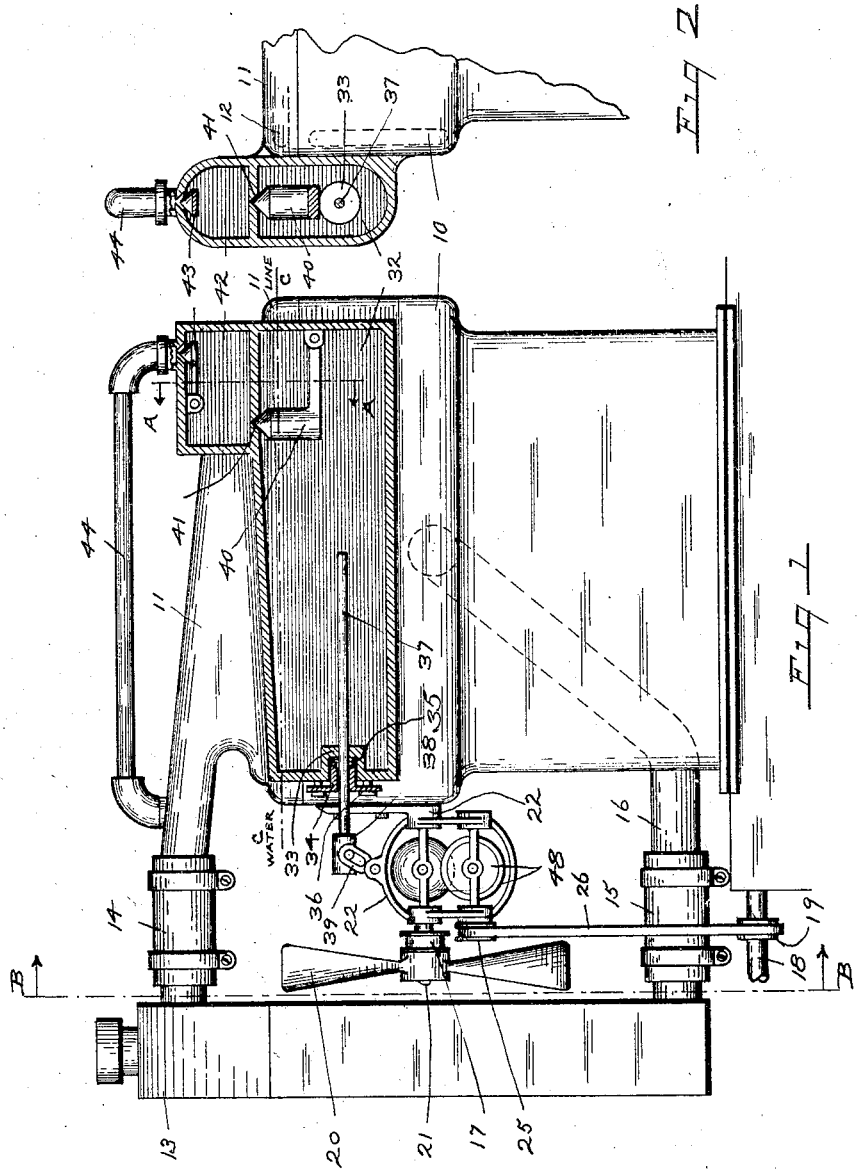
INVENTOR
Frank O. Vaughn
BY John J. Thompson
ATTORNEY

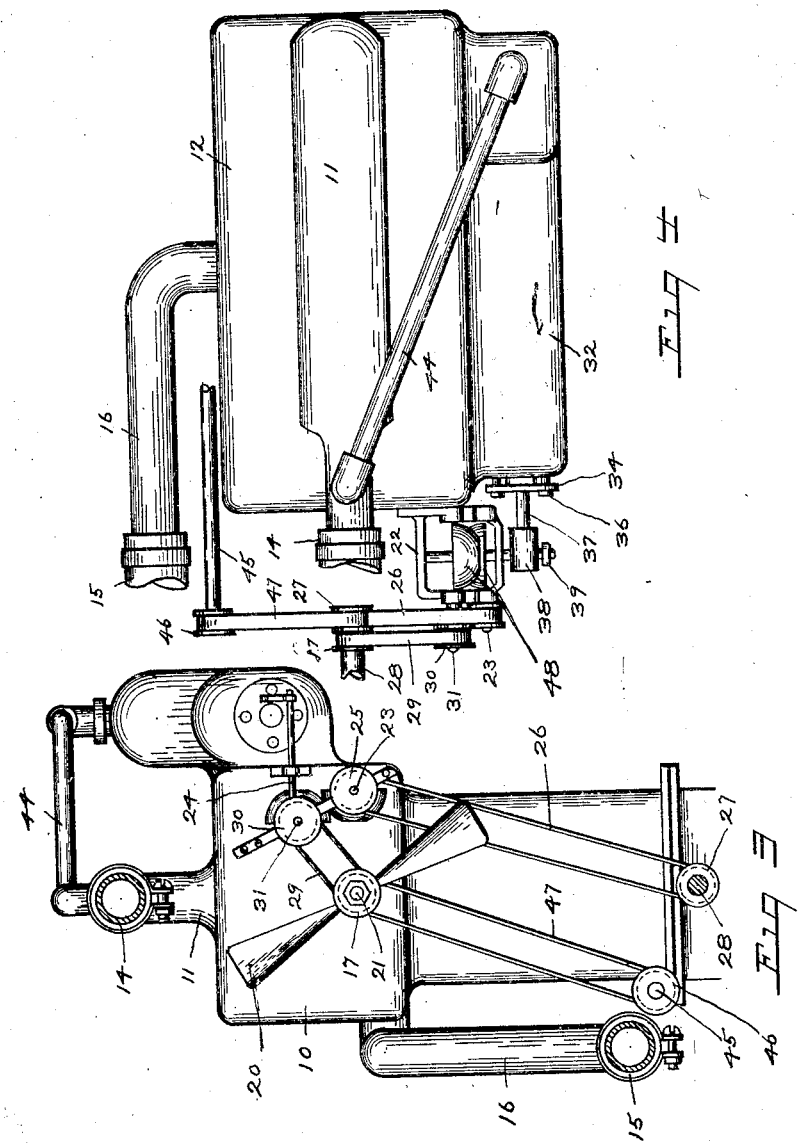

Patented Sept. 10, 1929.

1,727,950

UNITED STATES PATENT OFFICE.

FRANK O. VAUGHN, OF POUGHKEEPSIE, NEW YORK.

HEAT REGULATOR.

Application filed June 30, 1928. Serial No. 289,539.

In the operation of water cooled internal combustion engines of the type used in automobiles, it is a well known fact that to get the highest efficiency from the engine, the temperature must be kept at the proper degree, which is in the neighborhood of 200 degrees F.; this being effected in a crude manner by the use of a cooling fan, operated at a constant speed and without regard to the changes effected in temperature by the different seasons of the year, the heat of the engine being too low in cold weather and too hot in hot weather.

To overcome this defect there have been several methods employed of varying the speed of the fan, either by a slip belt or clutch, or changing the pitch of the fan blades, and all of these devices are operated by thermostats which are in turn caused to act by the temperature of the water in the engine.

In these methods the action is very slow, the friction on the moving parts of the fan is great owing to the action of clutches, etc., and the thermostatic parts are delicate and easily gotten out of order.

The object of the invention is to provide means whereby the fan shall be operated by a variable speed gearing, in which the ratio of speed is changed without the use of clutches.

Another object of the invention is to provide a novel means whereby the operation of the change of speed of the fan gearing is effected by the direct expansion of heated water.

Still another object of the invention is to provide means for this purpose that shall be simple, contain few parts, and be easily applied to both old and new automobile engines. With these and other objects in view, my invention consists in certain construction and combination of parts as will hereinafter be fully described and claimed and illustrated in the accompanying drawings, in which like figures of reference refer to corresponding parts in all of the views, but it is understood that slight changes may be made without departing from the spirit of the invention.

In the drawings:—

Figure 1 is a partial side elevation of an automobile engine, showing my device embodied therein, and also showing some of the parts in section.

Figure 2 is a vertical cross sectional view of the expansion chambers, taken on the line A—A of Figure 1.

Figure 3 is a front elevation of the engine, taken on the line B—B of Figure 1.

Figure 4 is a partial top plan view of the same.

Referring to the drawings:—

The automobile engine is designated by the numeral 10, and is provided with the usual removal head 11, having the upper water cooling chamber 12, connected to the radiator 13, by the hose connection in the usual way; the water circuit being completed by the lower hose connection 15, and pipe 16 to the water jacket of the engine 10; said flow of water being actuated by a water pump, operating shaft 18 and pulley 19.

The cooling fan 20 is mounted on the end of a shaft 21, which forms a part of a variable speed drive, and which is mounted in a frame 22, which is secured to the front of the engine 10.

This variable speed drive may be of any desired type, but is here shown as that type which forms the subject matter of a separate application, and which need not be described in detail here, but in a general way, as comprising a drive shaft 23 and a driven shaft 31, and a lever 24 for varying the ratio.

The drive shaft 23 is provided with a pulley 25, and is rotated by a belt 26, from a pulley 27 mounted on the crank shaft 28 of the engine 10; while the fan pulley 17 is rotated by a belt 29 from a pulley 30 mounted on the end of the driven shaft 31.

For operating the lever 24 to regulate the ratio of the variable speed drive, I have provided the following device which is operated by the expansion of water.

To the side of the engine 10, near the top thereof and on the opposite side from the exhaust and intake manifolds, is formed an expansion chamber 32, being formed or provided in the front end thereof with a bearing 33, having a stuffing box 34, packing 35, and secured by the bolts 36. Within this bearing and stuffing box 34 is mounted a plunger 37, having free longitudinal movement, and designed to be moved outward by the expansion of the water in said chamber 32, as the temperature is raised by the heat of the engine above the required degree; and by this movement of the plunger 37, through the action of a head 38 attached thereto and a link 39, the operating or adjusting lever 24 is moved to change the ratio of the variable speed drive and slow up the action of the fan 20 as the heat of the engine lowers, and to speed up the action of the fan as the heat of the engine rises.

For compensating for the loss of water in the expansion chamber, due to leakage and evaporation, there is provided in the highest part of the chamber 32, a float valve 40, which is weighted and adapted to close a passage 41, which communicates with a supply or feed tank 42, which is located above said chamber 32; said feed tank 42, being provided with a check valve 43 for regulating the flow of water from a feed pipe 44 which is connected with the water system of the engine 10; said valves being so designed that when one is open the other will remain closed; that is the pressure in the chamber 32, will retain the valve 40 closed, until such time as the pressure is lowered or the water level lowers, when said valve will open to admit water from the feed tank 42, which after filling the chamber 32 will close the valve 40, and the valve 43 will now open to admit water from the feed pipe 44 to the feed tank 42.

It will also be noted that a belt 47 may be used to run a pulley 46 on the pump shaft 45 from the fan pulley 17 if so desired.

Also that in the form of variable speed drive employed, cones 48 are used, and as the normal position of said cones produces a fast drive, this action will tend to move the plunger 37 inwardly as against the expansion of the water, but if this action is not sufficient to move said plunger inward, a light spring may be employed for this purpose.

Having thus described my invention, what I claim as new and desire to secure by Letters Patent, is:—

1. In a cooling fan for internal combustion engines adapted to be rotated at varying speeds, of a variable speed drive adapted to rotate said fan, a liquid expansion chamber mounted adjacent the engine and adapted to be heated thereby, and means actuated by said liquid expansion chamber to operate said variable speed drive.

2. In a variable cooling means for automobile engines, comprising in combination with a rotating fan, of a variable speed drive for rotating the same, a liquid expansion chamber designed to be heated by the heat of the automobile engine, and a plunger mounted in said expansion chamber and adapted to be actuated by the expansion of liquid in said chamber to operate said variable speed drive.

In testimony whereof I affix my signature.

FRANK O. VAUGHN.